June 3, 1952 P. HARDCASTLE ET AL 2,598,690
CAM ENGAGED CLUTCH
Filed Feb. 20, 1948

PHILIP HARDCASTLE
ERIC P. REID
INVENTOR.

BY Lester B. Clark
& Ray L. Smith
ATTORNEYS

Patented June 3, 1952

2,598,690

UNITED STATES PATENT OFFICE 2,598,690

CAM ENGAGED CLUTCH

Philip Hardcastle and Eric P. Reid, Houston, Tex.

Application February 20, 1948, Serial No. 9,857

2 Claims. (Cl. 192—93)

The invention relates to a clutch assembly for transmitting energy to and from a shaft.

An object of the present invention is to provide a clutch assembly which can be easily mounted on a shaft so that energy can be transmitted to and from such shaft.

Another object of the invention is to provide a clutch assembly which can be easily manufactured and which can be adapted to fit various size shafts for transmitting energy to and from such shaft.

Still another object of the invention is to provide in a clutch assembly having a driven member which is normally in free rotational relationship with respect to the shaft on which the assembly is mounted, there being novel means associated with the assembly to fix or lock the member in rotational relationship with the shaft.

Another and more specific object is to provide a clutch unit including a pair of clutching collars and a wedge ring cooperating therewith to effect engagement and release of the clutch of the unit.

A still further object is to provide a clutch having a manually contractable wedge ring adapted to effect positive engagement of the clutch.

Figure 1:
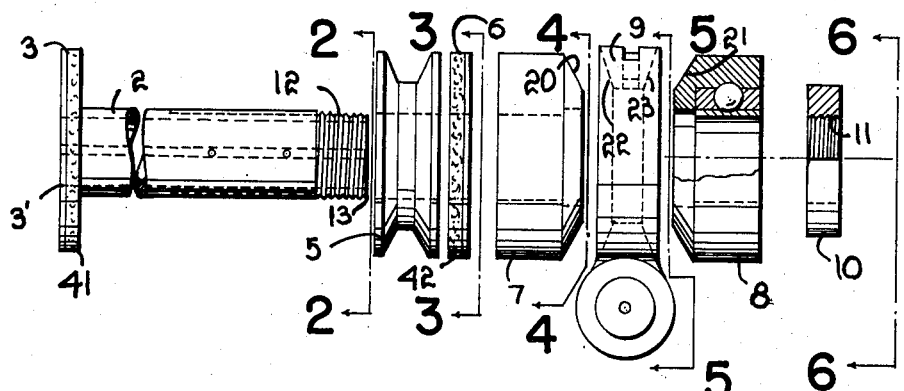
Figure 2:
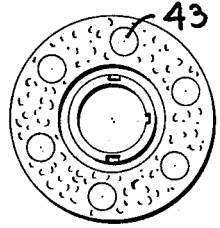
Figures 3, 4:
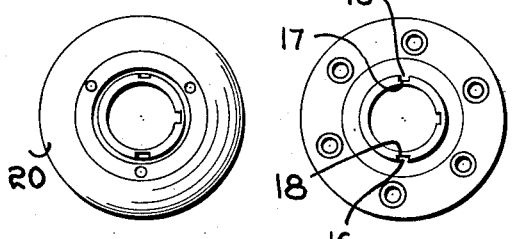

Other and further objects and advantages of the invention will become more readily apparent from a consideration of the following descriptions and drawings, wherein:

Fig. 1 is an exploded view showing the component parts of the assembly.

Figs. 2, 3, 4, 5, and 6 are vertical elevations on the lines, 2—2, 3—3, 4—4, 5—5 and 6—6, respectively of Fig. 1.

Figure 7:
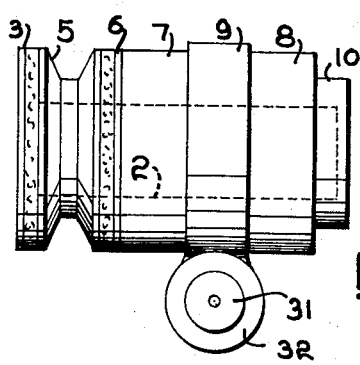
Figure 6:
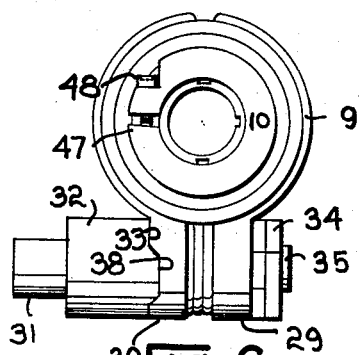

Fig. 7 is an elevation showing the arrangement of the parts when assembled.

In Fig. 1 an embodiment is illustrated as comprising a sleeve 2 with the flange or friction element 3 secured to the end 3' thereof. Suitable power receiving and transmission means is shown as a clutched element comprising the pulley 5 which normally fits adjacent the collar 3 and a second friction element 6 is arranged on the other side thereof. A pair of throw-out collars 7 and 8 are slidably and rotatably arranged on the sleeve 2. Fitting between the throw-out collars 7 and 8 is a wedge ring 9. A collar 10 with threads 11 engages the threads 12 on the end 13 of the sleeve 2 and serves to maintain parts in assembled relation and also to provide adjustability to compensate for wear.

The component parts of the assembly are arranged upon the sleeve 2 in the relationship as illustrated in Fig. 1 to provide the complete assembly, as shown in elevation in Fig. 7. When the assembly is in a declutched position, the clutched element 5 will be in free rotational relationship with the sleeve. It is apparent, therefore, that no power, under such circumstances, will be transmitted between the pulley and shaft, or vice versa.

If, however, the collars 7 and 8 are separated axially of the sleeve 2 so that the friction elements 3 and 6 abut the pulley; the pulley and the collars will be locked in rotational relationship with the sleeve and the shaft upon which it is mounted. It is understood, of course, that the sleeve 2 is non-rotatably fixed upon the shaft with which the clutch is used, suitable securing means being shown as a keyway 12 which is arranged to receive a key that will similarly engage the shaft.

The frictional element or plate 6 is provided with inwardly extending projections 15 and 16 which enter the keyways 17 and 18 on the outer periphery of the sleeve 2. It seems obvious that any suitable number of projections and keyways can be provided in the assembly, the main object being to retain the collar 6 slidably but non-rotatably mounted upon the sleeve 2.

Figure 5:
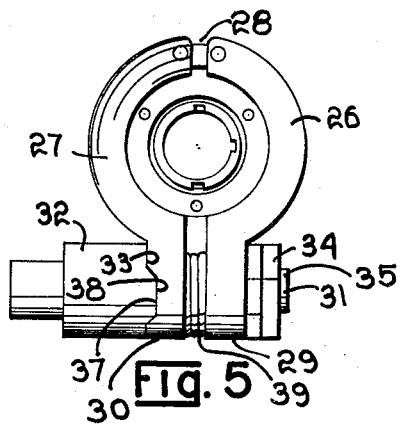

As best seen in Fig. 1, the rear surface 20 of the throw-out collar 7 is tapered as is the forward surface 21 of the member 8 whereby these surfaces converge toward the axis of rotation of the unit. The wedge ring 9 is provided with complementary tapers 22 and 23 which are adapted to fit the tapers 20 and 21 upon the members 7 and 8. This wedge ring 9 is shown as composed of segments 26 and 27, as shown in Fig. 5, which are pivotally interconnected by the link 28. Opposite the link 28 the ears 29 and 30 are provided on the segments 26 and 27 respectively.

Fitting through the ears is a stud 31 which has the enlargement 32 thereon having a shoulder engaging one side surface 33 of the ear 30. Such stud is retained in position by lock nuts 34 on the threaded end 35 of the stud. A projection 37 on the enlargement 32 fits within a depression 38 having tapered side walls, and it is to be noted that when the projection rides upon these side walls the two halves of the wedge ring 26 and 27 form the greatest diameter of the ring, and such ring will not be in frictional contact with either of the members 7 or 8.

A compression spring 39 surrounds the stud 31 between the ears 29 and 30 and urges the halves of the wedge ring 26 and 27 to their outermost position whereby the ears 29 and 30 are constantly held in engagement with the lock nuts 34 and the enlargement 32, respectively, on the stud 31.

It is to be understood that the stud 31 may be rotated either manually, or mechanically about its own axis to effect clutching or declutching of the unit. As already explained, the clutch is released when the parts are in the relative positions indicated in Fig. 6. If, however, the stud 31 is rotated about its own axis the projection 37 rides upon the tapered side surfaces of the depression 38, the spring 39 is compressed and, at the same time, the wedge ring 9 is contracted. Such contraction forces the throw-out collars 7 and 8 apart and forces the friction discs 41 and 42 into engagement with the pulley 5 whereby desired clutching is effected. The friction material of the discs 42 and 43 is of course suitably secured to the metal backing therefor as by means of rivets 43.

When the projection 37 rides upon the annular shoulder at one side of the depression 38 in the ear 30, the clutch is fully engaged and will remain engaged until the stud 31 is again rotated sufficiently that projection 37 reenters the depression 38, at which time the spring 39 will force the ears 29 and 30 apart to effect declutching.

In order to compensate for wear of the friction material of discs 41 and 42, the collar 10 is adjustably arranged upon the sleeve 2. As wear occurs, the collar 10 can be adjusted so that the clutch will be fully engaged when the stud 31 is rotated to cause the projections 37 to ride upon the annular segmental surfaces at opposite sides of the depression 38. In order to retain the collar 10 in this set position, it is split at 47 and is provided with a clamping screw 48.

While the invention has been described as including the sleeve 2 as an arrangement thereof, it seems obvious that such sleeve could be dispensed with and the remaining component parts of the assembly arranged directly upon a shaft.

In this connection the collar 3 would be fixed upon a shaft. The remaining component parts could then be positioned thereon exactly as shown in Fig. 1, the only exception being that the hollow sleeve 2 has now become the shaft upon which such sleeve was formerly mounted.

While it is believed that the invention is apparent from the foregoing, by way of further illustration and amplification it is assumed that the device is on a shaft and in the position illustrated in Figs. 5 and 7. In this position the clutched element or pulley 5 will be freely rotatable upon the shaft or sleeve and no energy will be transmitted to or taken from the shaft on which the unit is mounted.

In order to engage the clutch so that the pulley will be fixed upon the shaft, the rod 31 is rotated so that the two halves 26 and 27 of the wedge ring 9 are moved towards each other. When this occurs, the clutching collars 7 and 8 will be moved apart toward the collar 10 and the friction plate 6. Since the collar 10 is secured on the sleeve or shaft, the travel of the member 8 will be limited; however, the friction plate 6 is only slidably arranged upon the sleeve or shaft, and it will be moved until it wedges the pulley between it and the collar 3 so that the pulley rotates in unison with the sleeve or shaft upon which it is mounted.

Broadly, the invention contemplates a clutch assembly which can be readily mounted upon a shaft to transmit energy to and from such shaft.

We claim:

1. In a clutch mechanism comprising friction elements and a clutching element therebetween to be releasably interengaged thereby, the improvement comprising, a pair of throwout collars mounted coaxially of said elements and having opposed surfaces converging toward the axis of rotation, a wedge ring interposed between said collars and comprising pivotally interconnected sections having tapered surfaces complementary to the converging surfaces and the clutch collars, means normally urging the free ends of said sections apart, and manually operable means for moving said free ends toward each other whereby the clutch collars are separated to effect engagement of the friction and clutching elements.

2. In a clutch mechanism comprising friction elements and a clutching element therebetween to be releasably interengaged thereby, the improvement comprising, a pair of throwout collars mounted coaxially of said elements and having opposed surfaces converging toward the axis of rotation, a wedge ring interposed between said collars and comprising pivotally interconnected sections having tapered side surfaces complementary to the converging surfaces of the throwout collars, opposed outwardly extending ears on the free ends of said sections, spring means normally urging the sectors apart, and manually operable means engaging said ears and operable to move the sectors inwardly to separate the throwout collars and engage the clutch.

PHILIP HARDCASTLE.
ERIC P. REID.

REFERENCES CITED

The following references are of record in the file of this patent:

UNITED STATES PATENTS

| Number | Name | Date |
| --- | --- | --- |
| 1,405,927 | Lauth | Feb. 7, 1922 |
| 1,420,214 | Pierce | June 20, 1922 |
| 2,401,864 | Gerst | June 11, 1946 |
| 2,487,936 | McCrady et al. | Nov. 15, 1949 |

FOREIGN PATENTS

| Number | Country | Date |
| --- | --- | --- |
| 492,434 | France | July 8, 1919 |
| 565,199 | Great Britain | Oct. 31, 1944 |